(12) United States Patent
Couillard

(10) Patent No.: US 6,685,076 B2
(45) Date of Patent: Feb. 3, 2004

(54) ROLLER FOR NIPPED APPLICATIONS AND METHOD OF MAKING ROLLER

(75) Inventor: Cal Couillard, Deerfield, WI (US)

(73) Assignee: Componex Corporation, Edgerton, WI (US)

( * ) Notice: Subject to any disclaimer, the term of this patent is extended or adjusted under 35 U.S.C. 154(b) by 0 days.

(21) Appl. No.: 10/090,687

(22) Filed: Mar. 5, 2002

(65) Prior Publication Data

US 2002/0169059 A1 Nov. 14, 2002

Related U.S. Application Data

(60) Provisional application No. 60/273,395, filed on Mar. 5, 2001.

(51) Int. Cl.$^7$ .............................. B65H 20/00; B23K 9/00
(52) U.S. Cl. ........................... 226/186; 226/190; 492/3; 219/127
(58) Field of Search ................................. 226/186, 190; 248/694; 198/824, 837; 193/37; 492/3, 60; 219/127

(56) References Cited

U.S. PATENT DOCUMENTS

| | | | |
|---|---|---|---|
| 242,058 A | | 5/1881 | Schurmann |
| 589,191 A | | 8/1897 | Northey |
| 1,145,558 A | | 7/1915 | Coppage |
| 1,293,871 A | * | 9/1919 | Murray ........................ 219/127 |
| 1,622,758 A | | 3/1927 | Beulke et al. |
| 1,742,454 A | | 1/1930 | Van Derhoef |
| 2,270,436 A | | 1/1942 | Hart |
| 2,593,069 A | | 4/1952 | Steinmetz |
| 2,651,103 A | | 9/1953 | Hornbostel |
| 2,651,241 A | | 9/1953 | Hornbostel |
| 2,763,158 A | | 9/1956 | Firth |
| 2,808,730 A | | 10/1957 | Shank |
| 2,829,238 A | * | 4/1958 | Hackman ..................... 219/127 |
| 2,886,156 A | | 5/1959 | Halbron |
| 3,086,279 A | | 4/1963 | Alexeff |
| 3,389,448 A | * | 6/1968 | Buysch ......................... 492/6 |
| 3,797,082 A | | 3/1974 | Brunes |
| 3,958,837 A | | 5/1976 | Chagawa |
| 4,029,200 A | | 6/1977 | Dillon |
| 4,738,560 A | * | 4/1988 | Brussow et al. ........... 219/86.9 |
| 4,823,689 A | | 4/1989 | Kishino et al. |
| 5,011,401 A | * | 4/1991 | Sakurai et al. ................ 432/60 |
| 5,022,132 A | | 6/1991 | Valster et al. |
| 5,387,962 A | | 2/1995 | Castelli et al. |
| 5,568,976 A | | 10/1996 | Gabriele |
| 5,897,214 A | | 4/1999 | Nisley |
| 6,113,059 A | * | 9/2000 | Couillard ..................... 198/837 |

FOREIGN PATENT DOCUMENTS

DE          3700-596 A       7/1988

OTHER PUBLICATIONS

Winertia—Patented Idler Technology, "Finally, Aluminum Tubing Specifically Designed and Engineered for Idlers," Engineered Metals Corporation USA, (Oct 1997).
Winertia—Patented Idler Technology Specification Sheets, Engineered Metals Corporation USA, (Mar 1998) 8 pages.

* cited by examiner

Primary Examiner—Michael R. Mansen
(74) Attorney, Agent, or Firm—Michael Best & Friedrich LLP; Teresa J. Welch; Jeffrey D. Peterson

(57) ABSTRACT

A roller including an inner tubing and an outer tubing which is fixed relative to the inner tubing by welding the outer tubing to the inner tubing. The roller with weldments is particularly suitably for a nipped application.

3 Claims, 6 Drawing Sheets

ROLLER FOR NIPPED APPLICATIONS AND METHOD OF MAKING ROLLER

CROSS REFERENCE TO RELATED APPLICATIONS

The present application claims the benefit of the filing date of U.S. Provisional Patent Application No. 60/273,395 filed Mar. 5, 2001.

FIELD OF THE INVENTION

The present invention relates generally to rollers used in various kinds of machinery and, in particular, to rollers used in continuous web conveying or converting machinery.

BACKGROUND OF THE INVENTION

Because all kinds of conveying and converting systems utilize rollers, considerable attention has been given to improving their reliability, reducing bending of the tubing and reducing the inertial tension required to turn the roller. In web (i.e., continuous sheet) machinery, all kinds of materials, e.g., paper, plastic, tissue, foam, may be looped around a series of rollers. The rollers must have a necessary rigidity and strength to support a web load while withstanding the turning torque stress produced by the web. Rollers have been made of steel, aluminum or other metals to provide the necessary rigidity and strength. Yet, the materials themselves have inherent problems. For example, steel rollers require excessive horsepower to overcome the initial start-up inertia and to keeping the steel rollers turning.

Many patents disclose rollers and methods of making thereof. For example, U.S. Pat. No. 1,742,454 issued to Van Derhoef and U.S. Pat. No. 2,593,069 issued to Steinmetz teach methods of making roller rollers. U.S. Pat. No. 1,622,758 issued to Beulke et al.; U.S. Pat. No. 2,808,730 issued to Shank; and U.S. Pat. No. 3,958,837 issued to Chagawa disclose improved roller designs. U.S. Pat. No. 4,029,200 issued to Dillon teaches a roller design fabricated in plastic. U.S. Pat. No. 5,022,132 issued to Valster et al. and U.S. Pat. No. 5,568,976 issued to Gabriele disclose bearing mounts for rollers. U.S. Pat. No. 5,387,962 issued to Castelli et al. discloses a self-aligning roll for belt loop modules.

In continuous web making machinery, all kinds of materials, e.g., paper, plastic, tissue, film, fabric, foam, etc., may be transported through a nip formed between two rollers. The purpose of a nip between a pair of rollers is to exert pressure on the web material. As is generally known, it is desirable to produce a uniform pressure across the nip formed between the rollers.

One way to produce this desired result is to form a gradual crown on the outer surfaces of the rollers. The crown is in the form of a gradual increase in diameter of the roller toward the midpoint of the roller. When a crowned roller is combined with a straight roller or another crowned roller, and the ends of the opposed rollers are brought together, a uniform pressure can be produced along the entire length of the rollers as the rollers deflect under the applied load.

In many machines and systems, many different crowns are needed for various sized rollers. The process of crowning a roller requires extensive, precision machining, thereby resulting in substantial sums associated with labor and manufacturing costs. Moreover, in many machines and systems, many different rollers of different lengths and diameters are needed. This requires extensive fabrication, costing substantial sums for labor and parts, as well as requiring a large inventory of tubing and bearing assemblies.

Notwithstanding these known rollers and bearing mounts, the art has not adequately responded to date with the introduction of an roller which reduces job specific construction by eliminating end plugs, balancing weights, and extensive machining.

SUMMARY OF THE INVENTION

Accordingly, the present invention provides a roller design which substantially reduces the need for crowning rollers used in nipped applications, and generally reduces job specific construction in other applications. In one aspect of the present invention, there is provided an inner tubing and an outer tubing concentrically disposed around the inner tubing. The inner tubing has an outer diameter and the outer tubing has an inner diameter which is larger than the outer diameter of the inner tubing. To fix the positions of the inner and outer tubing, e.g., weldments spaced a distance from each end of the tubings are suitably provided to secure the outer tubing to the inner tubing. During a nipped application, the outer tubing will pivot about the weldments to substantially provide a uniform pressure across the nip. This pivoting effect reduces the amount of crowning normally required for a particular nipped application.

In another aspect of the present invention, there is provided a method of assembling a roller as just described. The method includes providing an inner tubing and an outer tubing, placing the outer tubing around the inner tubing, positioning a fixture device at opposite ends of the roller to space the outer tubing away from the inner tubing, drilling a plurality of holes around the circumference of the outer tubing at a distance spaced inward from both ends of the roller, filling the holes with welding material to securely fasten the outer tubing to the inner tubing, and thereafter removing the fixture device from between the inner tubing and the outer tubing.

The foregoing design of an inner and outer tubing can be extended to other embodiments in which the inner and outer tubings are secured relative to each other by different means. Thus, in another aspect, the present invention provides a roller tubing, which includes an outer elongate tube; an inner elongate tube concentrically disposed within the outer tube; and a plurality of radially disposed spokes rigidly interconnecting the inner tube to the outer tube.

In yet another aspect, the invention provides a roller which includes a substantially cylindrical roller body having opposed ends. The roller body includes an outer elongate tube; an inner elongate tube concentrically disposed within the outer tube; a plurality of radially disposed spokes rigidly interconnecting the inner tube to the outer tube; and a pair of bearings, spaced apart and press fit into the inner surface of the inner tube, at a distance apart from the ends of the roller body.

In a further aspect, the invention provides a method of constructing an roller. The method includes the steps of (i) providing a length of a tubing having opposed ends, and including an outer elongate tube; an inner elongate tube having an inner surface, and concentrically disposed within the outer tube; and a plurality of spokes rigidly interconnecting the inner tube to the outer tube; (ii) inserting a bearing assembly into the inner surface of the inner tube at a distance apart from an end of the tubing material, the inner surface closely receiving the bearing assembly; and (iii) press-fitting a support shaft into the bearing assembly.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which.

Figure 1:
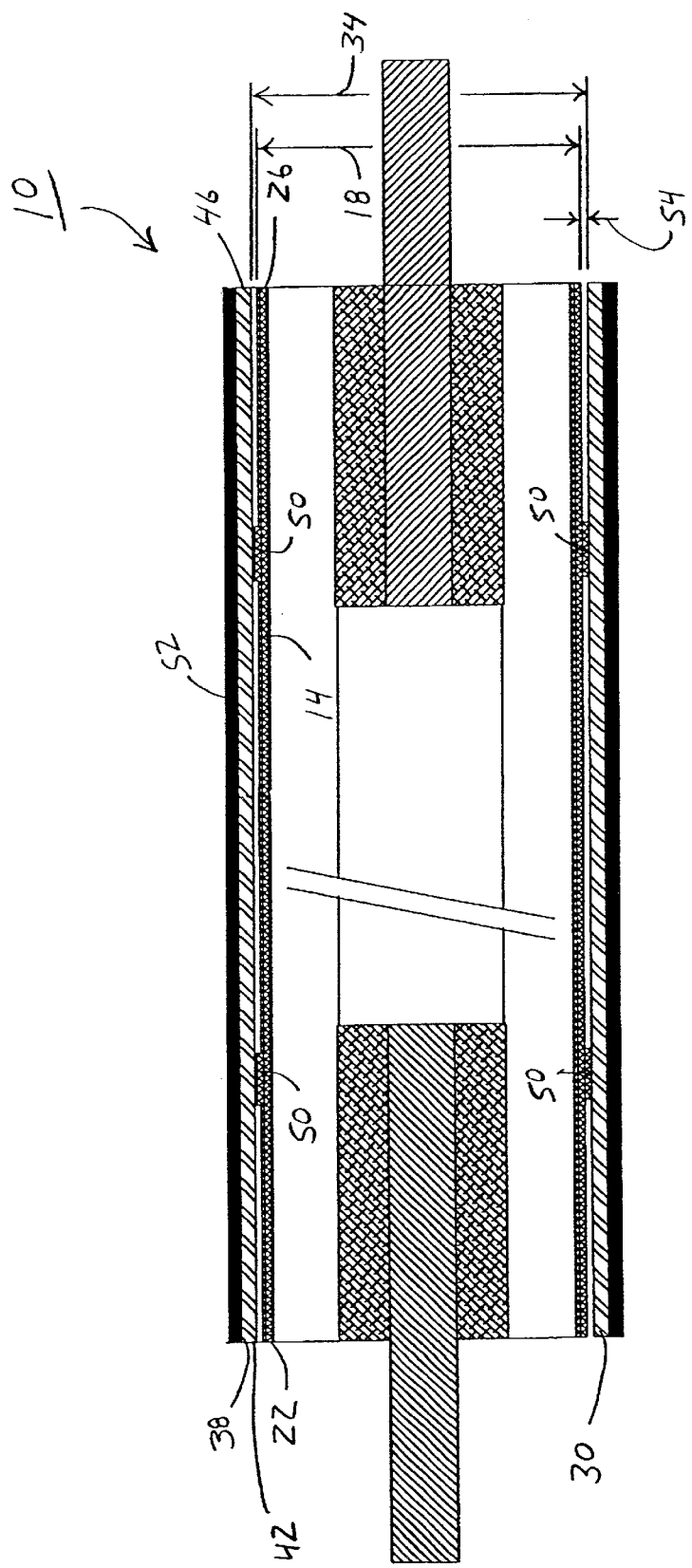
FIG. 1 is a cross-sectional view of a roller according to one aspect of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENT

Figure 2:
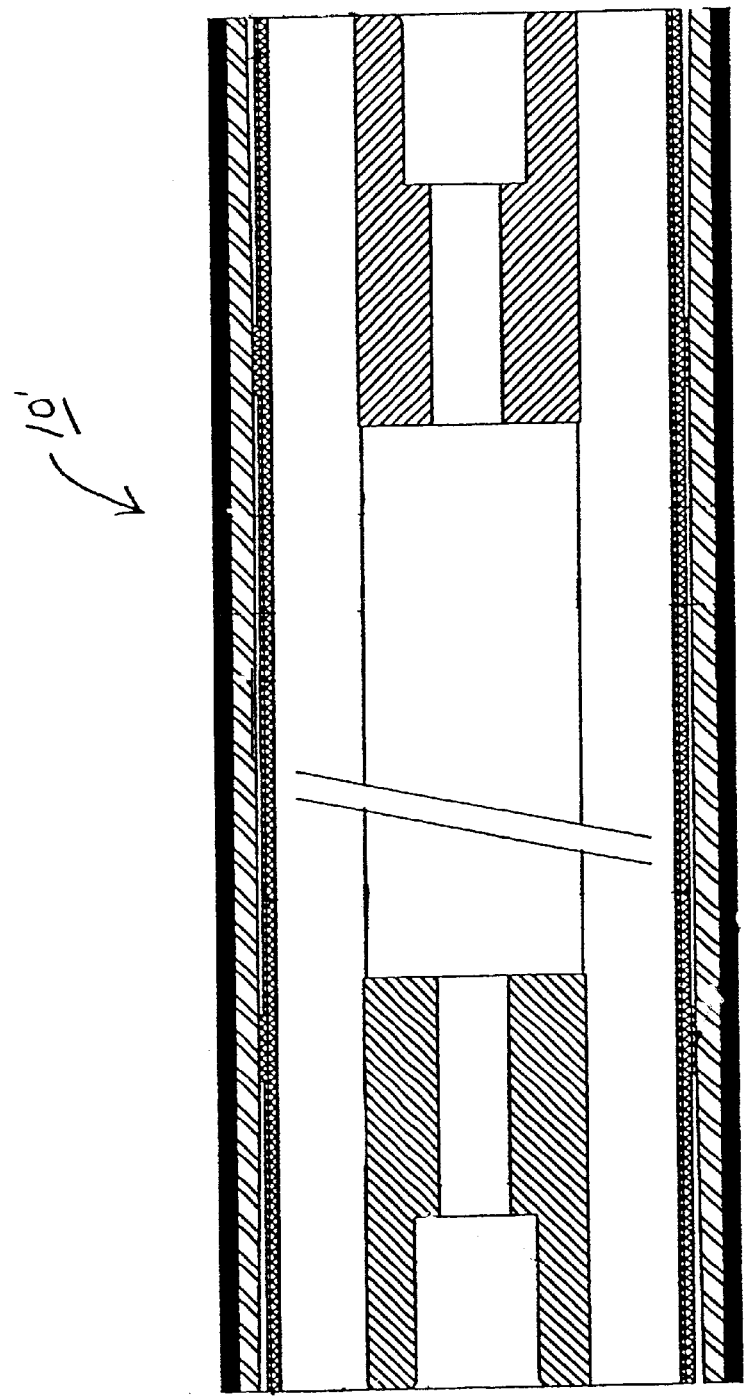
FIG. 2 is a cross-sectional view of an alternative roller according to one aspect of the present invention.
Figure 3:
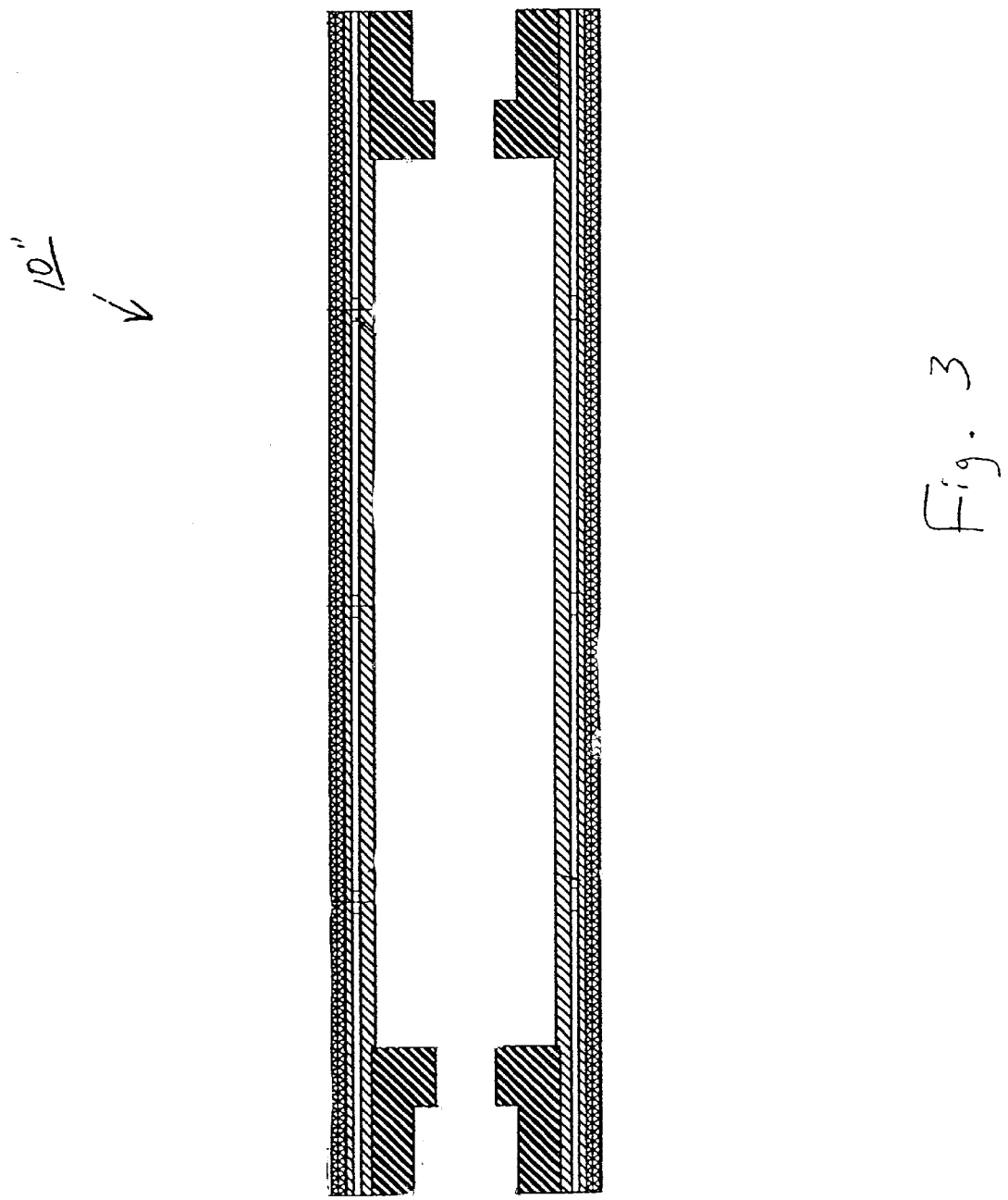
FIG. 3 is a cross-sectional view of yet another alternative roller according one aspect of the present invention.
Figure 4:
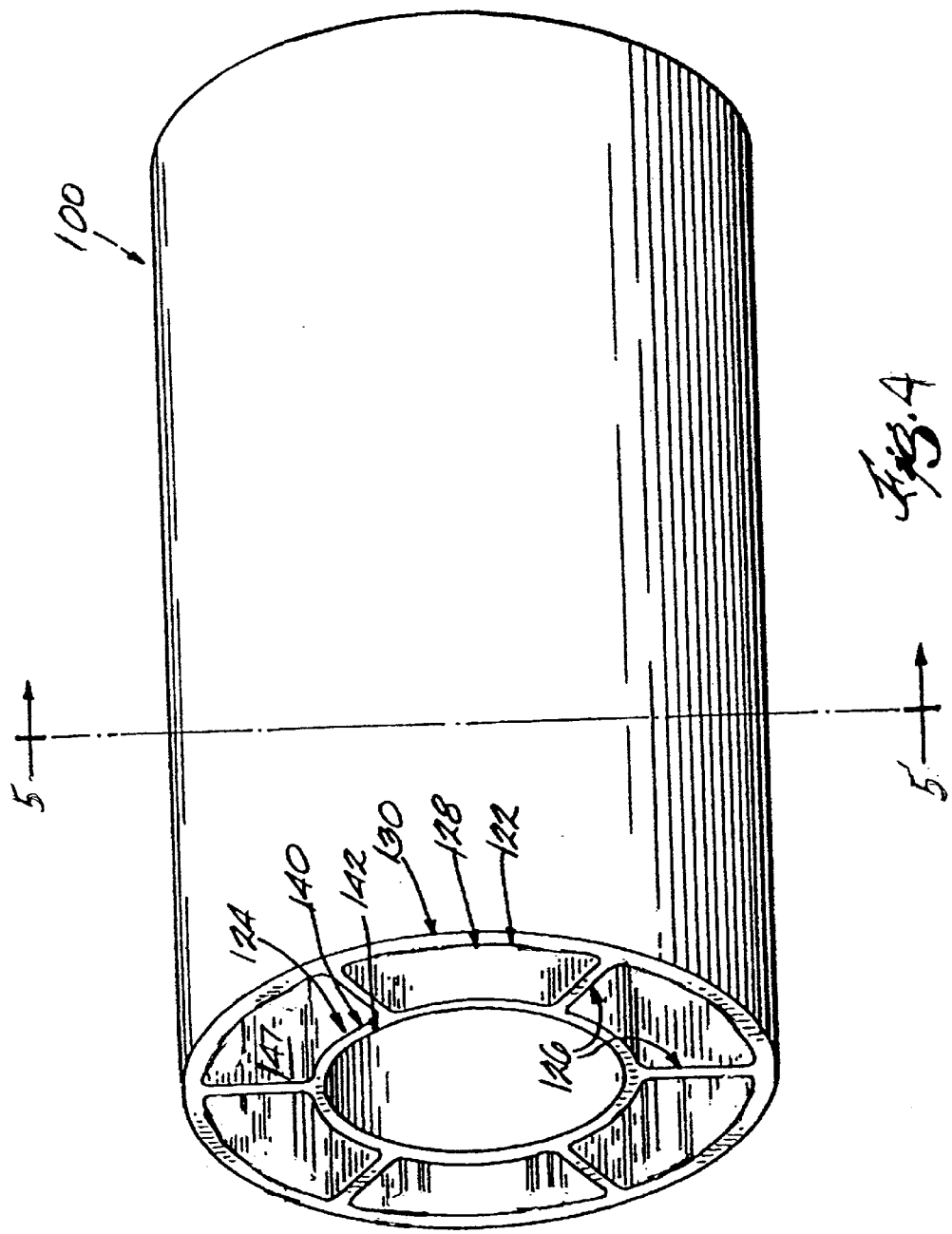
FIG. 4 is an isometric view of a roller tubing in accordance with yet another aspect of the present invention.
Figure 5:
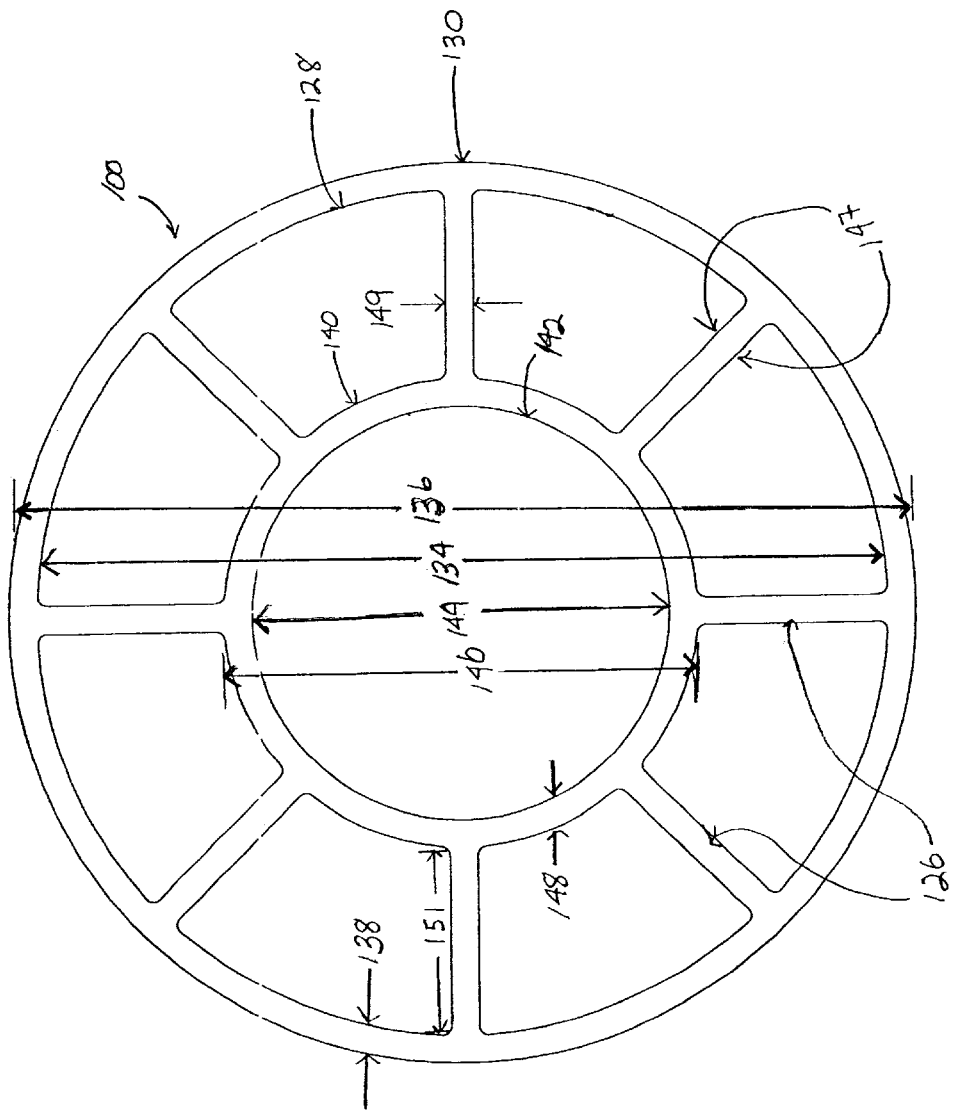
FIG. 5 is a cross-sectional view of the roller tubing of FIG. 4 along line 5–5'.

Illustrated in FIGS. 1–3 are rollers embodying one aspect of the present invention. FIGS. 4 and 5 embody another aspect of the present invention. It should be understood that the principles of the present invention can be applied to other roller designs, and the rollers shown and described in FIGS. 1–5 are merely examples of such rollers.

Reference is initially made to FIG. 1 depicting a roller 10 in accordance with the present invention. The roller 10 is substantially cylindrical. The roller 10 is suitably made of steel or aluminum, but can be made of other suitable materials. The roller 10 is shown as being a cantilevered roller, but may be of other suitable rollers. The roller 10 includes an elongated inner tubing 14 having an outer diameter 18, a first end 22 and a second end 26. The inner tubing 14 can be substantially hollow as shown or of any other suitable construction. The roller 10 further includes an elongated outer tubing 30 having an inner diameter 34, an outer circumferential surface 38, a first end 42 and a second end 46. The roller 10 rotates about a shaft according to any acceptable manner, such as by providing a pair of bearing assemblies on opposite ends of the roller 10 between the inner tubing 14 and the axial shaft. In one aspect of the invention, the outer tubing 30 is fixed in position relative to the inner tubing 14, by weldments, as shown by reference numeral 50 depicting the welding material. A rubberized surface 52 may be applied to the outer tubing 30, if desired.

The roller 10 is assembled as follows. The inner diameter 34 of the outer tubing 30 is larger than the outer diameter 18 of the inner tubing 14, so that the outer tubing 30 can be positioned over the inner tubing 14. A fixture device (not shown) is positioned between the inner tubing 14 and the outer tubing 30, so that the central longitudinal axes of the inner tubing 14 and the outer tubing 30 are substantially coincident (see reference numeral 54 referring to the circumferential space between the outer surface of the inner tubing 14 and the inner surface of the outer tubing 30). Although not clearly shown, a plurality of holes spaced inward from each end 42 and 46 of the outer tubing 30 are drilled through the outer tubing material. Preferably, the holes are equally spaced from the ends 42 and 46, and also equally spaced around the circumference of the outer tubing 30. Referring to FIG. 1, the holes are located approximately halfway from the ends of the tubing 42 and 46, respectively, to the middle of the outer tubing 30, but may be located in other suitable locations. Any number of holes may be provided around the circumference of the outer tubing 30, depending on the desired effect. The holes may have different diameters, depending on the desired weld between the inner tubing 14 and the outer tubing 30. The holes are filled with appropriate welding material, such as aluminum welding rods, so as to secure the outer tubing 30 to the inner tubing 14. As representatively shown by reference numerals 50, the welding material will slightly spread out in the space 54 between the inner tubing 14 and the outer tubing 30.

According to the principles of the present invention, in a nipped application, the outer tubing 30 is designed to pivot about the weldments 50. In this way, as the ends of opposing rollers are brought together, the portion of the outer tubing 30 between the weldments 50 will tend to bow outward, thereby minimizing the need for crowning the roller 10.

FIG. 2 depicts an alternative roller 10'. The roller 10' incorporates the features of the WINertia dead shaft roller roll sold by Engineered Metals Corporation of Monona, Wis., and described in U.S. Pat. No. 6,113,059, which is hereby incorporated herein by reference.

FIG. 3 depicts yet another roller 10".

Reference is now made to FIGS. 4 and 5 depicting a roller tubing in accordance with another aspect of the present invention, and generally designated as reference numeral 100. Tubing 100 is substantially cylindrical, and has an outer elongate, substantially hollow cylindrical wall, shell or tube 122 and an inner elongate, substantially hollow cylindrical wall of shell 124 concentrically disposed within the outer wall 122. The central longitudinal axes of tubes 122 and 124 are substantially coincident with each other. Outer shell 122 and inner shell 124 are fixed relative to each other, e.g., by being rigidly interconnected by a plurality of elongate interconnectors, bars or spokes 126 which run the length of tubing 100. The number of spokes 126 can be varied, for example, from three to nine.

Outer shell 122 has an inside circumferential surface 128, an outside circumferential surface 130. Outer shell 122 also has an inside diameter 134, an outside diameter 136 and a wall thickness 138. Thickness 138 is suitably, e.g., about 0.200 inches.

Inner shell 124 has an outer circumferential surface 140 and an inner circumferential surface 142. Inner shell 124 has an inside diameter 144, an outer diameter 146 and a wall thickness 148. Thickness 148 is suitably, e.g., about 0.100–0.150 inches depending on diameter 136 of outer wall 122. The thicknesses of both shells 122 and 124 are substantially less than the typical nominal sidewall thickness of conventional single-walled tubing.

Spokes 126 interconnect outer surface 140 of inner tube 124 with inside surface 128 of outside tube 122, spokes 126 being radially disposed and equally spaced on circumferential surface 140 and circumferential surface 128 and extending therebetween. Spokes 126 define a plurality of spaces 127. Spokes 126 have sidewalls 147, a thickness 149 and a length 151. Thickness 149 is suitably, e.g., about 0.100–0.150 inches depending on diameter 136 of outer wall 122. The spokes 126 can be of any length, e.g., length 151 is suitably about 0.5 inch to 1.5 inches depending on diameter 136. Concentric shells 122 and 124 and spokes 126 are suitably constructed of materials such as extruded aluminum, carbon fiber and plastic. The plastic is suitably any hard wearing, impact resistant polymer or copolymer composition, e.g., a polyester, a polypropylene, a non-foamed polyurethane.

Figure 6:
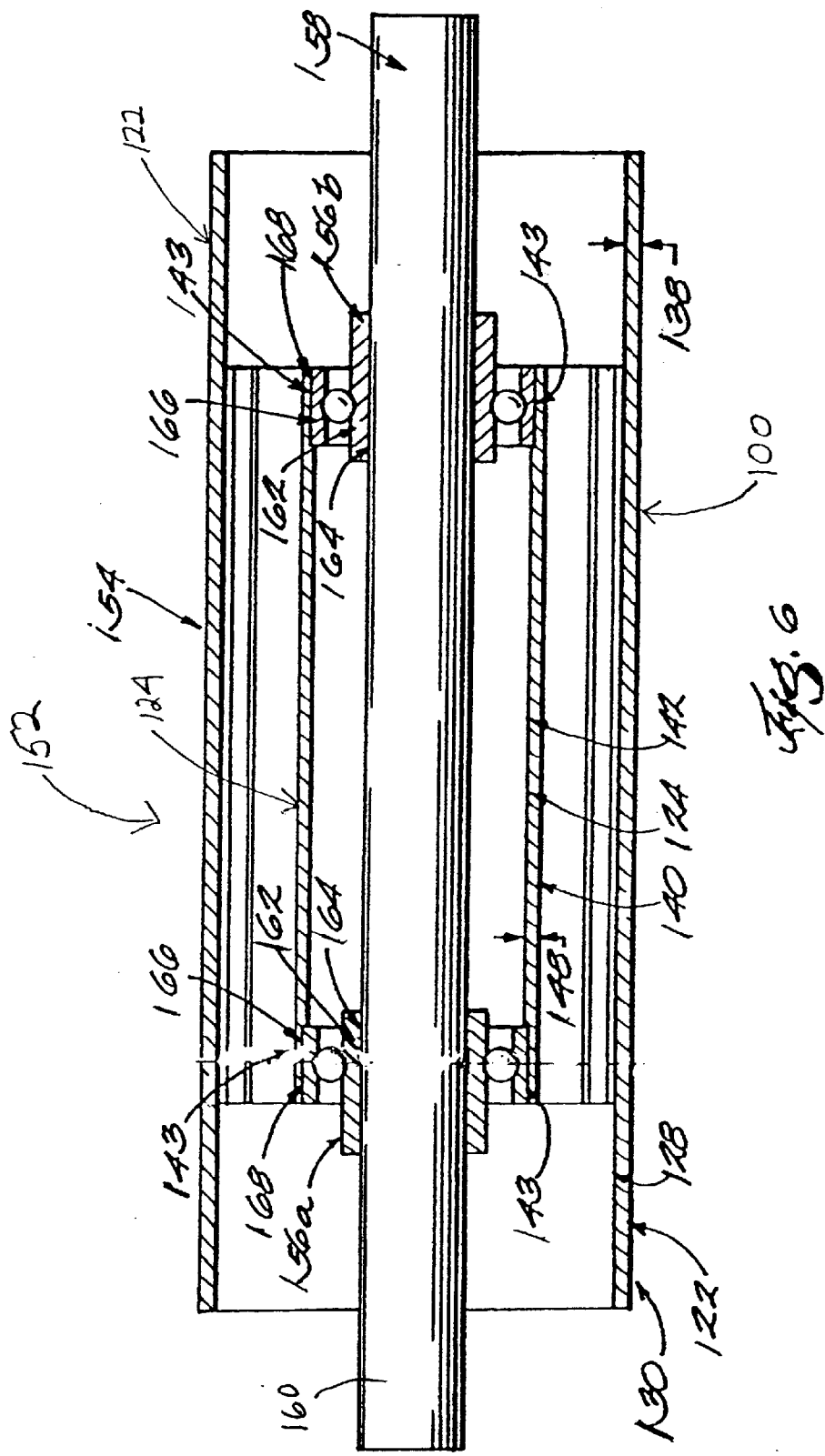
FIG. 6 is a cross-sectional view of a roller in accordance with the present invention, illustrating the placement of bearings assemblies in the recessed bearing bores.

Reference is now made to FIG. 6 wherein a roller 152 constructed of tubing 100 having outer shell 122, inner shell 124 and spokes 126 as described hereinbefore, is shown. Roller 152 includes a roller body 154, two bearing assemblies 156a and 156b and an axial elongate roller support shaft 158 about which roller 152 rotates. Support shaft 158 has an outer circumferential surface 160. The central longitudinal axes of support shaft 158 and roller 152 are substantially coincident.

Bearing assemblies 156a and 156b each have an inner race 162 with an inner circumferential surface 164 and an outer race 166 with an outer circumferential surface 168. Inner race 162 is press-fit onto support shaft 158 and outer race 166 is press-fit into a machined inner surface 143 of inner surface 142 of inner tube 124, i.e., surface 143 is suitably machined, as needed, to match the bearing assembly outside diameter to form machined surface 143. In this way, roller body 154 rotates in unison with outer race 166 of the bearing. The press or interference fit between outer circumferential surface 168 of outer race 166 and machined inner surface 143 of inner tube 124 prevents roller body 154 from rotating relative to outer race 166. The press or interference fit between inner circumferential surface 164 of inner race 162 and outer circumferential surface 160 of support shaft 158 prevents inner race 162 from rotating relative to support shaft 158. While roller body 154 is suitably made of, e.g., extruded aluminum, carbon fiber or plastic, support shaft 158 may be suitably made of the same or another material, e.g., steel. Bearing 156a and 156b may be any class of insert ball bearings.

As can be seen in FIG. 6, bearings 156a and 156b are recessed from the ends of roller body 154. Tubing 100, from which roller body 154 is constructed, permits bearings to be so mounted and recessed in inner tube 124. As such, no end plugs are necessary, thus, eliminating their installation and their machining for bearing bores. The recessed mounting also shortens the distance between the bearings and therefore, decreases the deflection property in the roller body as explained in detail hereinafter.

Inside diameter 144 of inner tube 124 is matched to industry standards for bearings. Thus, while outer diameter 136 of outer tube or shell 122 can be varied, e.g., 4", 5", 6", inside diameter 144 of inner tube or shell 124 can be maintained to match the industry standards for bearings. As outer diameter 136 increases, length 151 and thickness 148 of spokes 126 are also proportionately increased as the distance between inner tube 124 and outer tube 122 increases.

A roller constructed from double-walled tubing material in accordance with the present invention provides an advantageous 20% reduction in weight on average compared to ordinary single-walled tubing because of its thinner walls. Thus, the tubing provides substantial cost savings in tubing materials.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A roller comprising:

an inner elongate tubing having an outer diameter;

an outer elongate tubing having an inner diameter which is larger than the outer diameter of the inner tubing, the outer tubing being disposed about the inner tubing;

means for fixing the outer tubing relative to the inner tubing, wherein the means for fixing comprises a first weld between the inner tubing and the outer tubing, the first weld being positioned a distance inward from one end of the inner tubing and the outer tubing, and a second weld between the inner tubing and the outer tubing, the second weld being positioned a distance inward from an opposite end of the inner tubing and the outer tubing; and wherein the outer elongate tubing can pivot about the first and second welds, such that the outer elongate tubing can bow outward.

2. A member suitable for an roller, comprising: a double-walled tube, wherein the tube comprises an outer elongate tubing having a first outside surface and a first inside surface; an inner elongate tubing having a second outside surface and a second inside surface, wherein the inner elongate tubing is concentrically disposed within the outer elongate tubing;

means for fixing the outer tubing relative to the inner tubing, wherein the means for fixing comprises a first weld between the second outside surface of the inner elongate tubing and the first inside surface of the outer elongate tubing, the first weld being positioned a distance inward from one end of the inner elongate tubing and the outer elongate tubing, and a second weld between the second outside surface of the inner elongate tubing and the first inside surface of the outer elongate tubing, the second weld being positioned a distance inward from an opposite end of the inner elongate tubing and the outer elongate tubing; and wherein the outer elongate tubing can pivot about the first and second welds, such that the outer elongate tubing can bow outward.

3. A method of assembling a roller comprising:

positioning an outer elongate tubing having opposed ends around an inner elongate tubing having opposed ends;

drilling a plurality of holes in the outer elongate tubing, the holes being positioned inward from the ends of the outer elongate tubing;

filling the holes with welding material;

welding the welding material to securely fasten the outer tubing to the inner tubing, such that the outer elongate tubing can pivot about the first and second welds, and such that the outer elongate tubing can bow outward.

* * * * *